July 6, 1926.
O. P. SMITH
1,591,569
ELECTRIC CAR
Filed Oct. 17, 1922
2 Sheets-Sheet 2
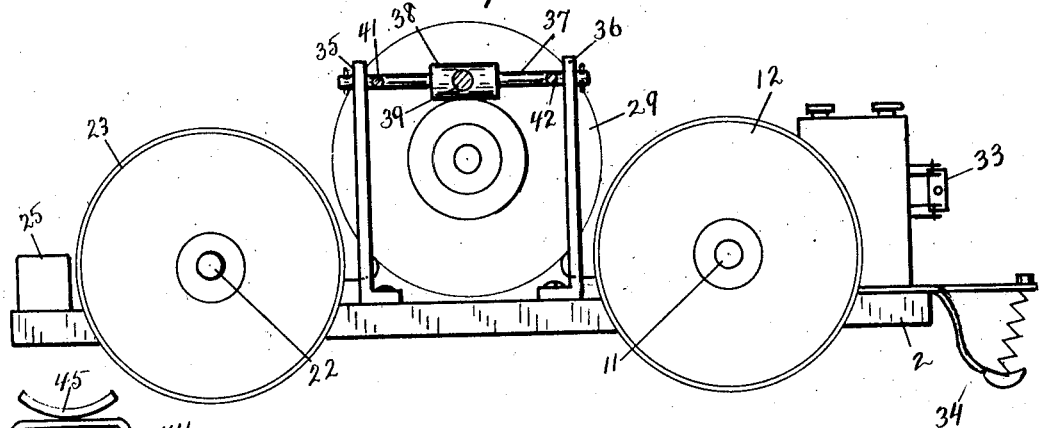
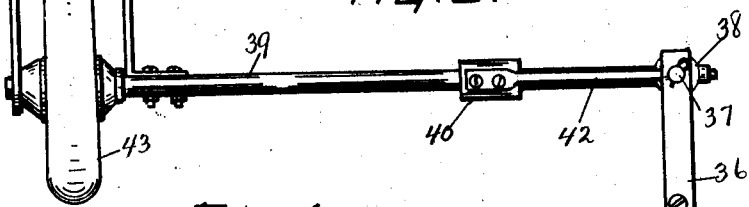
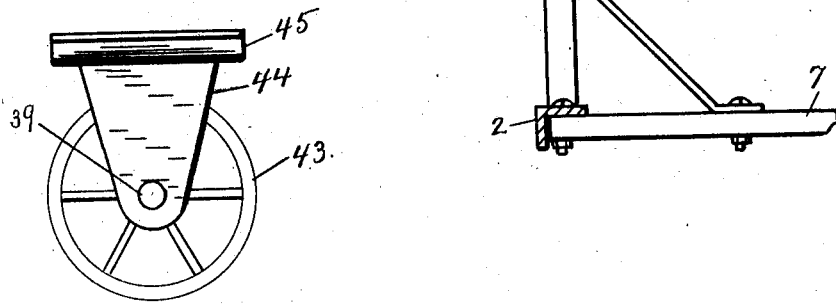
Owen P. Smith
INVENTOR.
BY Chester W. Brown
ATTORNEYS.

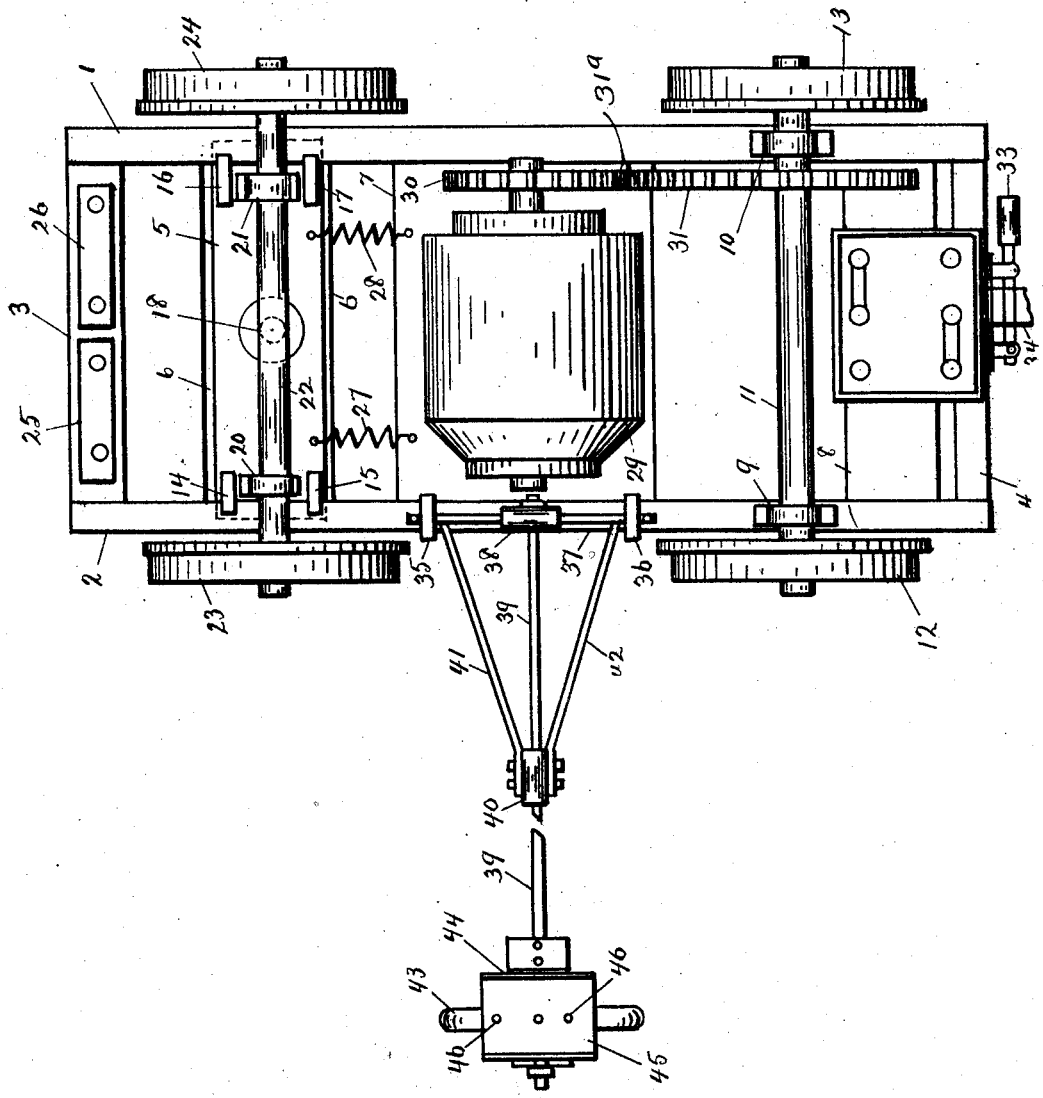

Patented July 6, 1926.

1,591,569

UNITED STATES PATENT OFFICE.

OWEN P. SMITH, OF CHICAGO, ILLINOIS.

ELECTRIC CAR.

Application filed October 17, 1922. Serial No. 595,045.

My invention relates to electric cars, and especially to that class which is employed in conveying some object, or objects, as a lure, or bait in dog racing and the like, at a high rate of speed about a small circular track.

The object of my invention is to provide such an electric car, which can be operated by an electric current and the speed of which can be controlled at the will of the operator located at some suitable point along the circumference of the track.

And another object is to provide suitable means for supporting and carrying the object or objects to be conveyed around said track by the said electric car.

With the above, and other objects in view which will be more particularly set forth in the following specification, my invention consists of the arrangement and combination of parts as hereinafter described and claimed, and while the invention is not restricted to the exact details of construction disclosed herein, yet, for the purposes of illustrating a particular embodiment thereof, reference is had to the accompanying drawings, in which like reference characters designate the same parts throughout the several views, and in which, Figure 1 is a top plan view of my said electric car, with part of contact shoe broken off.

Figure 2 is a side view and elevation of my said car, with portions of the arm 39 and parts attached broken off.

Figure 3 is a detail view of the arm 39, wheel 43 and bracket 44.

Figure 4 is a detail view of the wheel 43, arm 39 and parts shown in Figure 3, taken from left of Figure 3.

In the construction of my said electric car, I have preferably made the frame work of angle iron, as 1 and 2 for the side rails, and 3 and 4 for the end pieces. These parts are securely attached at the corners, either by rivets or by welding, as may be desired. To support the working parts upon said car, I have provided suitable cross pieces attached to the side rails, as 6, 7, 8, all of which are suitably attached to the side rails at either side and form a bed for said car. At the rear of the aforesaid side rails 1 and 2, I have provided suitable bearings as 9 and 10 in which is rotatably mounted the axle 11, and at the respective ends of this axle I have provided the two flanged drive wheels as 12 and 13 for operation upon a suitable rail track (not shown) and for propelling said car, as hereinafter described.

At the forward part of my said car, I have provided the loosely mounted cross piece, as 5. This cross piece is mounted upon a pin or king bolt as 18, passing through a suitable opening in the cross piece 6, and suitably mounted in the cross piece 5 as shown by dotted lines in Figure 1. To retain said cross piece in operating position, I have provided suitable guides, as 14, 15, 16, 17, which are attached to said cross piece near its ends, and extend up and above the upper portion of the side rails 1 and 2 as shown. As the ends of the cross piece are disposed below the upper portion of the side rails, as shown in dotted lines Figure 1, it will be apparent that when the cross piece is moved backward and forward in operation, that it will retain its original horizontal position, by reason of the cross piece being disposed below a portion of the side rails, and the guides being disposed above said side rails.

Attached to the cross bar 5 I have provided two suitable bearings, as 20 and 21, and in these bearings I have mounted the axle 22, with the two flanged traction wheels 23 and 24 attached at its ends, for operation upon a suitable rail track. At 25 and 26 I have provided suitable weights to hold the car down against any accidental tendency to raise and jump off the rails in its operation.

At 27 and 28 I have provided tension springs extending from a suitable connection with the loosely mounted cross bar 5 to corresponding connections with the fixed cross bar 7. The purpose of these springs is to counterbalance each other, and hold the cross bar 5, and the axle and wheels mounted thereon, in alignment with the rear wheels 12 and 13, and yet to permit the forward cross bar, 5 and the wheels 23 and 24 mounted thereon, to turn sufficiently to adjust their direction to any curve in the rail track upon which they are being operated, without too much friction, and without the danger of their jumping from the track on too short a curve, as would be the case if they were rigidly mounted upon the car frame similar to the mounting of the rear wheels.

At 29 I have provided a suitable electric motor having a gear wheel 30 mounted upon its shaft, and this gear wheel is in mesh with an idler gear 31ª which meshes with a gear wheel 31, which in turn is mounted upon the axle 11, and securely held against rotation thereon, by any suitable means as a set screw, or key. By this construction, whenever the motor is operated, it rotates the gear 30, and this gear 30, in turn operates the gear wheel 31 through the idler gear 31ª, and this rotates the axle 11, and the drive wheels 12 and 13 attached thereto, causing said car to move forward upon the rail track upon which it is mounted for operation, in the manner usual with electrically driven cars.

An electric contact shoe, to contact with a third rail (not shown) is provided at 34, attached to the rear of the car in Figure 2. At 33 is also provided a switch of the usual knife-edge style for switching the current in and out at the car.

At the side of the car as shown, I have attached the two upright supports 35 and 36, and at the upper parts of these supports I have provided suitable bearings in which is mounted the shaft 37. At the middle portion of said shaft 37, I have provided a collar as 38, and to this collar I have attached a horizontally extending arm 39. A suitable collar 40 is attached to the arm 39 as shown, and from this collar braces as 41 and 42 extend to and are attached near the ends of the shaft 37 to brace said construction, and increase its rigidity under strain in operation.

At the free end of the arm 39 I have mounted the rotating traction wheel 43 being adapted to contact with the ground or other support in its operation as hereinafter described, and upon said arm 39 above said wheel I have provided a bracket as 44, and on this bracket 44 I have mounted a saddle, as 45, adapted to receive and support objects, as rabbit lure, or other desired objects attached to said saddle by means of bolts passed through the holes 46 in said saddle as shown in Figure 1. The upright supports 35 and 36 may be braced as illustrated at 47 in Fig. 3 of the drawing to make them more rigid against the strain of operation. The brace 47 is inclined and may be mounted on any suitable portion of the framework adjacent the said uprights 35 and 36.

In its usual operation, my said electric car is propelled along upon rails, in the usual manner, by means of current supplied through line feed wires from the third rail and shoe to the motor. The traction wheel 43 rests upon the ground or other support provided, and rotates along at a course parallel to the electric car, and at a distance therefrom regulated by the length of the arm 39, which is the object to be attained.

Additional equipment may be provided to conceal the electric car, if desired, but such means are no part of the present invention.

Having thus described my said invention, what I claim and desire to secure by Letters Patent, is the following:—

In a device of the class described, the combination with an electrically driven car, of upright posts attached to one side of the frame, a rocker shaft mounted in bearings in said posts, a horizontally extending arm rigidly mounted in said shaft, a wheel rotatably mounted on the free end of said arm, a bracket also mounted upon the free end of said arm extending above the wheel, and a saddle mounted upon said bracket, substantially as shown and for the purposes described.

In testimony whereof, I have signed the foregoing specification.

OWEN P. SMITH.